United States Patent [19]
Anderson et al.

[11] Patent Number: 5,784,629
[45] Date of Patent: Jul. 21, 1998

[54] SYSTEM AND METHOD FOR CONSERVING POWER WITHIN A BACKUP BATTERY DEVICE

[75] Inventors: Eric C. Anderson, San Jose; Scott F. Fullam, Mountain View, both of Calif.

[73] Assignee: Apple Computer, Inc., Cupertino, Calif.

[21] Appl. No.: 719,264

[22] Filed: Sep. 24, 1996

[51] Int. Cl.[6] .................................................. G06F 1/32
[52] U.S. Cl. .................. 395/750.08; 395/750.01; 395/750.03; 395/750.06; 365/226; 365/227; 365/228; 365/229
[58] Field of Search .................. 395/750.03, 750.01, 395/750.05, 750.06, 750.08; 364/483, 492; 365/226, 227, 228, 229

[56] References Cited

U.S. PATENT DOCUMENTS

| | | | |
|---|---|---|---|
| 4,125,111 | 11/1978 | Hudspeth et al. | 600/502 |
| 4,416,282 | 11/1983 | Saulson et al. | 607/9 |
| 5,007,027 | 4/1991 | Shimoi | 365/229 |
| 5,193,538 | 3/1993 | Ekwall | 607/29 |
| 5,307,318 | 4/1994 | Nemoto | 365/226 |
| 5,475,428 | 12/1995 | Hintz et al. | 348/263 |
| 5,475,441 | 12/1995 | Parulski et al. | 348/552 |
| 5,477,264 | 12/1995 | Sarbadhikari et al. | 348/231 |
| 5,493,335 | 2/1996 | Parulski et al. | 348/233 |
| 5,673,304 | 9/1997 | Connor et al. | 379/45 |

OTHER PUBLICATIONS

Martyn Williams, Review–NEC PC–DC401 Digital Still Camera, AppleLink Newbytes, Mar. 15, 1996, pp. 1–3.

*Primary Examiner*—Ayaz R. Sheikh
*Assistant Examiner*—Ario Etienne
*Attorney, Agent, or Firm*—Carr & Ferrell LLP; Gregory J. Koerner

[57] ABSTRACT

A system and method for conserving power within a backup battery device comprises a main battery for generating a main operating voltage and a secondary operating voltage, a switching device for connecting the main operating voltage to a secondary power bus which powers a memory device, and a power manager for sensing whenever the main battery drops to a first threshold voltage, whereupon the power manager connects the secondary operating voltage to the secondary power bus if the memory device contains data, and disconnects the main operating voltage from the secondary power bus. The backup battery generates the secondary operating voltage whenever the power manager senses that the main battery has reached a second threshold voltage.

20 Claims, 7 Drawing Sheets

SYSTEM AND METHOD FOR CONSERVING POWER WITHIN A BACKUP BATTERY DEVICE

CROSS-REFERENCE TO RELATED APPLICATIONS

This application relates to co-pending U.S. patent application Ser. No. 08/666,241, entitled "System And Method For Using A Unified Memory Architecture To Implement A Digital Camera Device," filed on Jun. 20, 1996, and also to co-pending U.S. patent application Ser. No. , entitled "System And Method For Recovering From A Power Failure Within A Digital Camera Device," filed on Aug. 23, 1996, which are hereby incorporated by reference.

BACKGROUND OF THE INVENTION

1. Field of the Invention

This invention relates generally to power supply systems and more particularly to a system and method for conserving power within a backup battery device.

2. Description of the Background Art

Modern digital cameras typically include an imaging device which is controlled by a built-in computer system. The built-in computer system accesses raw image data captured by the imaging device and then processes and compresses the data before storing the compressed data into an internal memory. Protection of the captured image data is therefore an important consideration for camera designers and manufacturers.

One technique used to protect the captured image data is to provide a backup battery device which supplies backup power whenever the main battery voltage level sinks below a certain critical level necessary to maintain camera operation. Conventionally, the main battery is connected through a diode to the power bus. The backup battery is likewise connected through a separate diode to the power bus. The main battery is typically selected to have a larger initial voltage level than the backup battery. As the main battery is depleted and the main battery voltage becomes lower than the backup battery voltage, the polarities of the voltages biasing these two diodes are reversed and the backup battery is thus engaged to supply operating power to the power bus.

This conventional technique typically leaves a significant amount of power remaining in the main battery and this remaining power is therefore not effectively utilized. For camera functions which have small power consumption requirements, this unused power in the main battery could advantageously be used to provide operating power and thus conserve the power of the backup battery. Therefore, an improved system and method is needed for conserving power in a backup battery within a digital camera device.

SUMMARY OF THE INVENTION

In accordance with the present invention, a system and method are disclosed for conserving power within a backup battery device. In the preferred embodiment of the present invention, a digital camera includes an imaging device for capturing raw image data and a computer for processing, compressing and storing the image data. The computer includes a dynamic random-access memory (DRAM), a central processing unit (CPU) and a power management system. The power management system includes a power manager which controls a power supply that is powered by main batteries and which also may be connected to backup batteries, in the event of a power failure in the main batteries.

According to the present invention, the main batteries provide power to the power supply to generate various operating voltages, including a main operating voltage (VCC3) and a secondary KAPWR voltage. A Field-Effect Transistor (FET) switching device is controlled by the power manager to connect the VCC3 voltage to a secondary power bus (VCC3 DRAM) which powers the DRAM device.

The power manager accesses a voltage sensor device to detect when the main batteries drop to a first threshold voltage. In the preferred embodiment, this first threshold voltage equals 5.2 volts. When the first threshold voltage level is sensed, the power manager responsively generates a powerfail interrupt and performs a powerdown sequence which turns off the non-critical subsystems in the digital camera to conserve power. During this process, the power manager connects the KAPWR voltage to the secondary power bus only if the DRAM device contains captured image data. The present invention thus conserves power by powering the DRAM device only if image data is present and requires backup power to preserve the data.

The power manager then disconnects the VCC3 voltage from the secondary power bus (VCC3 DRAM). Subsequently, the backup batteries are engaged to generate the KAPWR voltage whenever the power manager senses, via a second voltage sensor, that the main batteries have reached a second lower threshold voltage. In the preferred embodiment, this second threshold voltage equals 4.5 volts. The present invention thus conserves backup battery power by engaging the backup batteries only upon reaching the second lower threshold voltage, thereby fully utilizing the available power contained in the main batteries.

DETAILED DESCRIPTION OF THE PREFERRED EMBODIMENT

The present invention discloses a system and method for conserving power within a backup battery device and comprises a main battery for generating a main operating voltage and a secondary KAPWR voltage, a switching device for connecting the main operating voltage to a secondary power bus which powers a DRAM device, and a power manager for sensing whenever the main battery drops to a first threshold voltage, whereupon the power manager connects the KAPWR voltage to the secondary power bus if the DRAM device contains image data, and disconnects the main operating voltage from the secondary power bus. The backup battery is engaged to generate the KAPWR voltage whenever the power manager senses that the main battery has reached a second lower threshold voltage.

Figure 1:
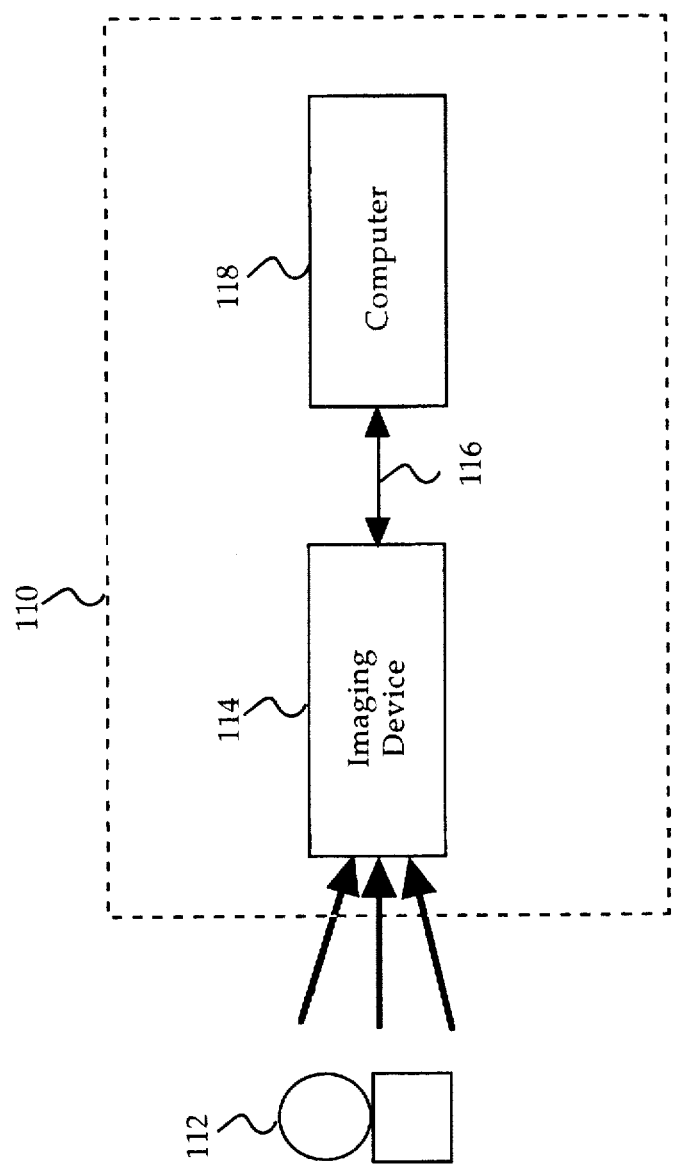
FIG. 1 is a block diagram of a digital camera according to the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
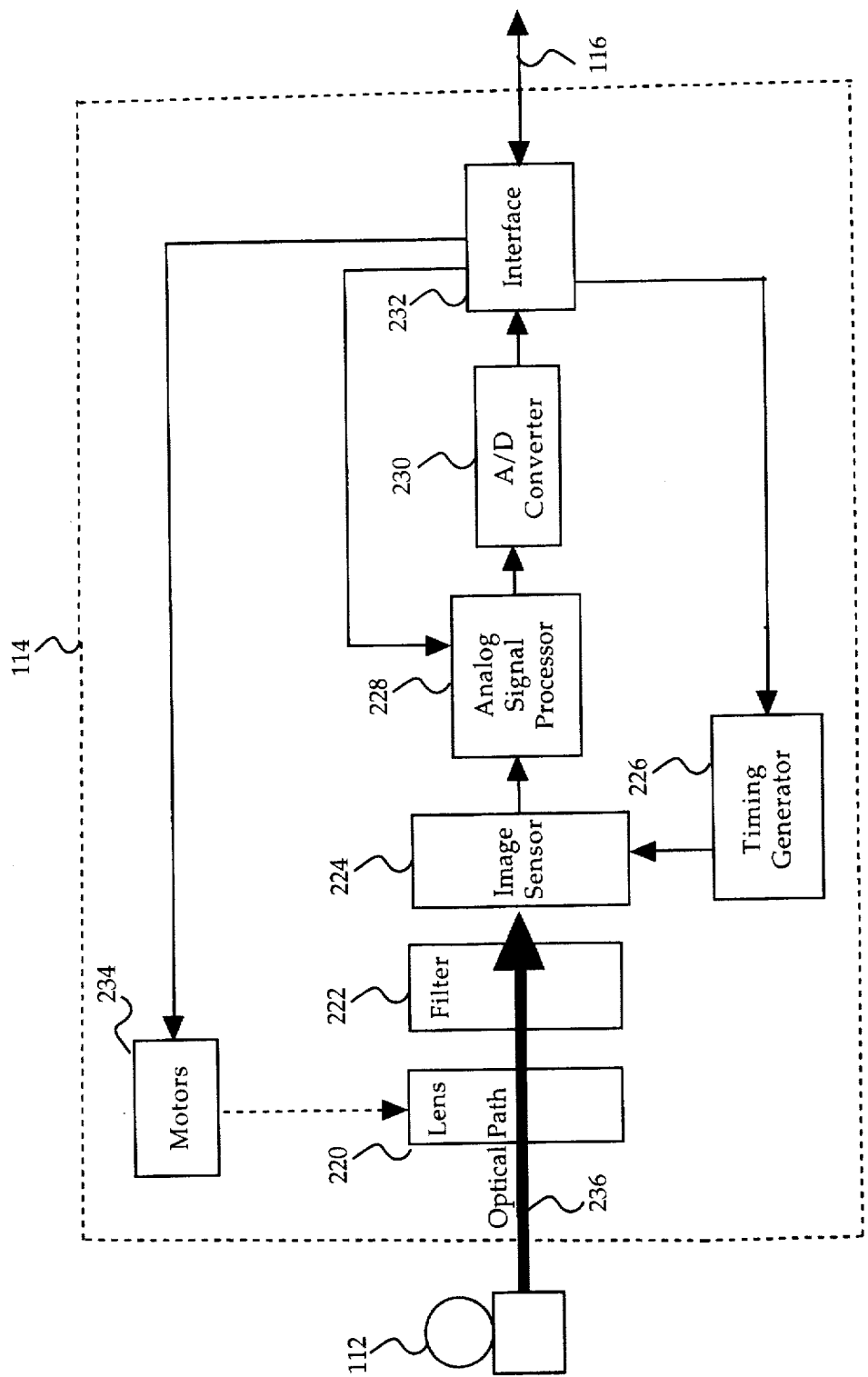
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. Pat. No. 5,496,106, entitled "A System and Method For Generating a Contrast Overlay as a Focus Assist for an Imaging Device," filed on Dec. 13, 1994 is incorporated herein by reference and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
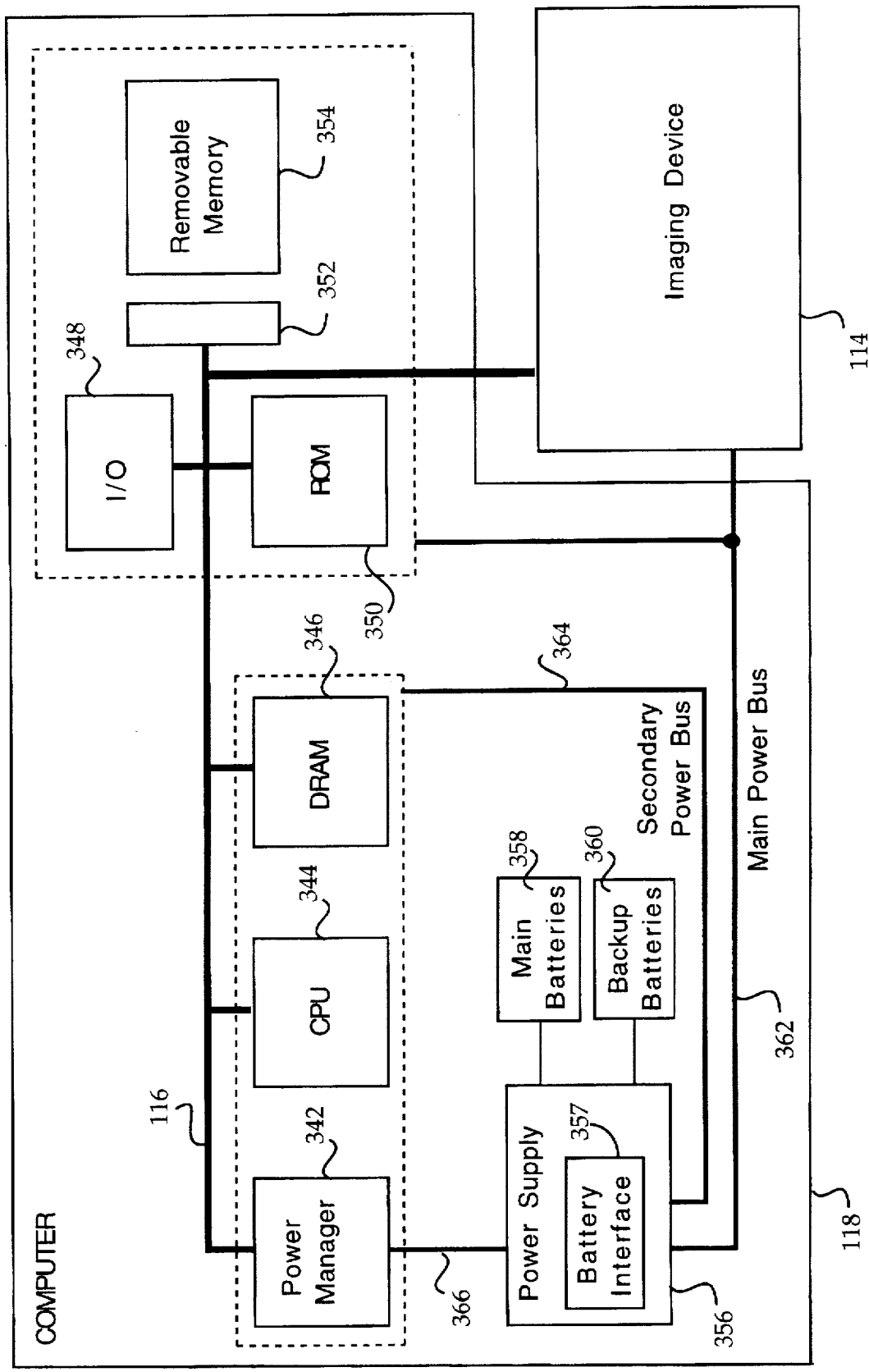
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions and is further discussed below in conjunction with FIG. 5.

I/O 348 is an interface device allowing communications to and from computer 118. For example, I/O 348 permits an external host computer (not shown) to connect to and communicate with computer 118. I/O 348 also permits a camera 110 user to communicate with camera 110 via a set of externally-mounted user controls and via an external LCD display panel. ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) may thus be protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

In the preferred embodiment, power supply 356 includes a battery interface 357 which selectively switches between main batteries 358 and backup batteries 360 to effectively preserve power within backup batteries 358 according to the present invention. The operation of battery interface 357 is further discussed below in conjunction with FIGS. 6 and 7.

Figure 4:
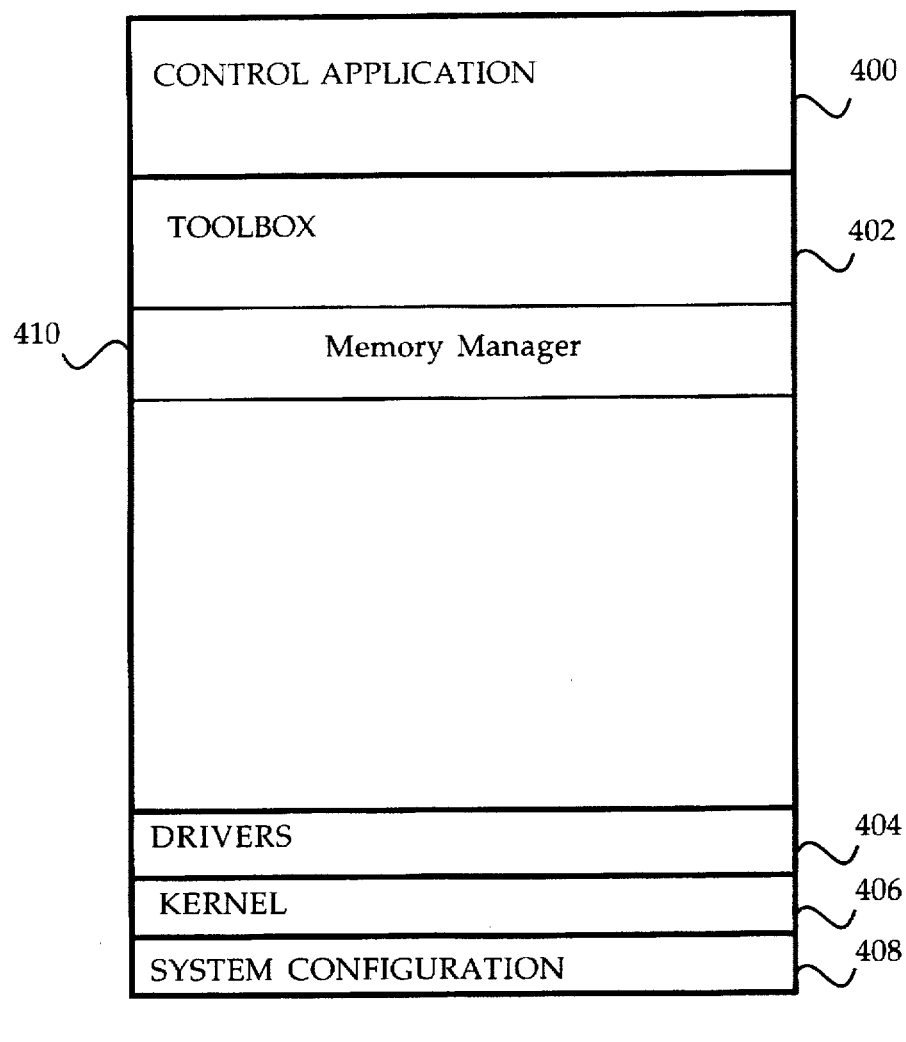
FIG. 4 is a memory map showing the preferred embodiment of the Read-Only-Memory (ROM) of FIG. 3.

Referring now to FIG. 4, a memory map showing the preferred embodiment of Read-Only-Memory (ROM) 350 is shown. In the preferred embodiment, ROM 350 includes control application 400, toolbox 402, drivers 404, kernel 406 and system configuration 408. Control application 400 comprises program instructions for controlling and coordinating the various functions of camera 110. Toolbox 402 contains selected function modules including memory manager 410 which is controlled by control application 400 and responsively allocates DRAM 346 storage locations depending upon the needs of computer 118 and the sets of received image data.

Drivers 404 control various hardware devices within camera 110 (for example, motors 234). Kernel 406 provides basic underlying services for the camera 110 operating system. System configuration 408 performs initial start-up routines for camera 110, including the boot routine and initial system diagnostics.

Figure 5:
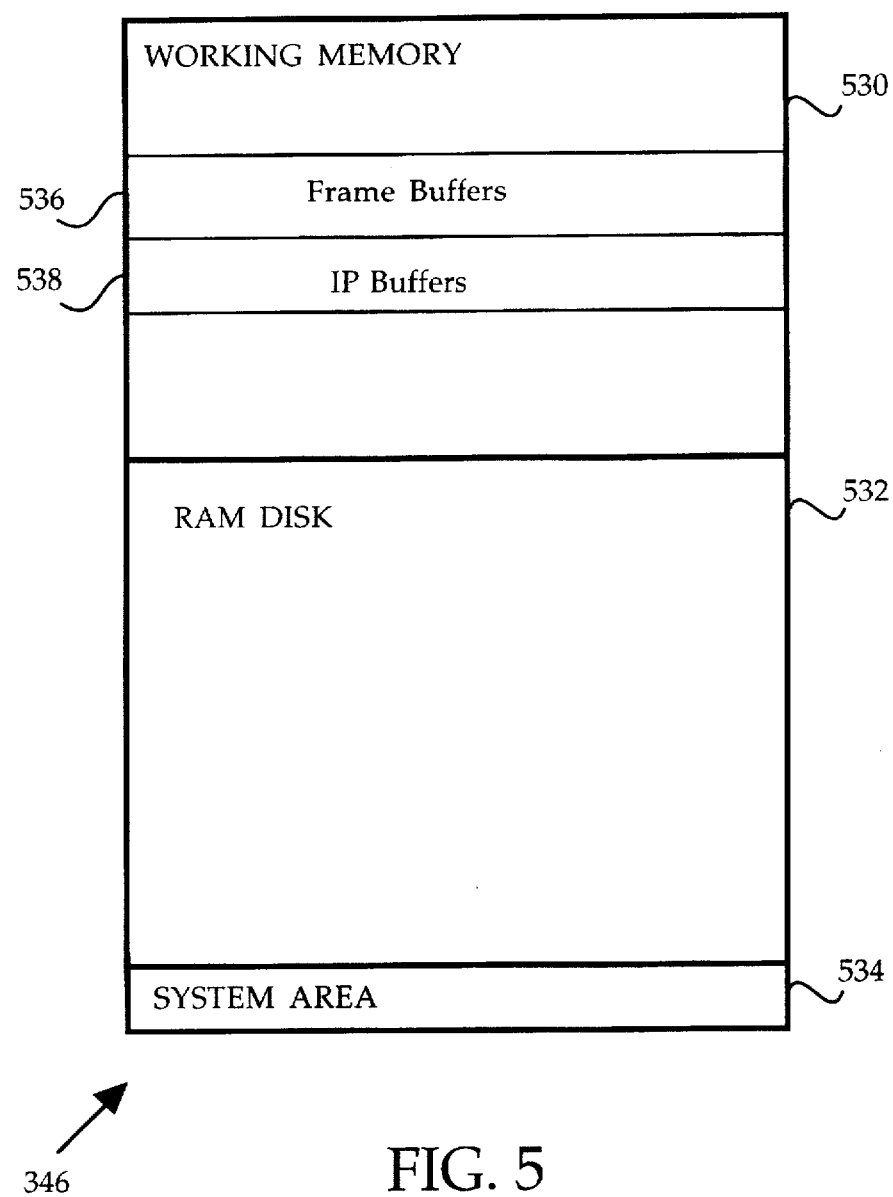
FIG. 5 is a memory map showing the preferred embodiment of the Dynamic Random-Access-Memory (DRAM) of FIG. 3.

Referring now to FIG. 5, a memory map showing the preferred embodiment of dynamic random-access-memory (DRAM) 346 is shown. In the preferred embodiment, DRAM 346 includes working memory 530, RAM disk 532 and system area 534. Working memory 530 includes frame buffers 536 (for initially storing sets of raw image data received from imaging device 114) and image processing (IP) buffers 538 (for temporarily storing image data during the image processing and compression 420 process). Working memory 530 may also contain various stacks, data structures and variables used by CPU 344 while executing the software routines used within computer 118.

RAM disk 532 is a memory area used for storing raw and compressed image data and typically is organized in a "sectored" format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 6:
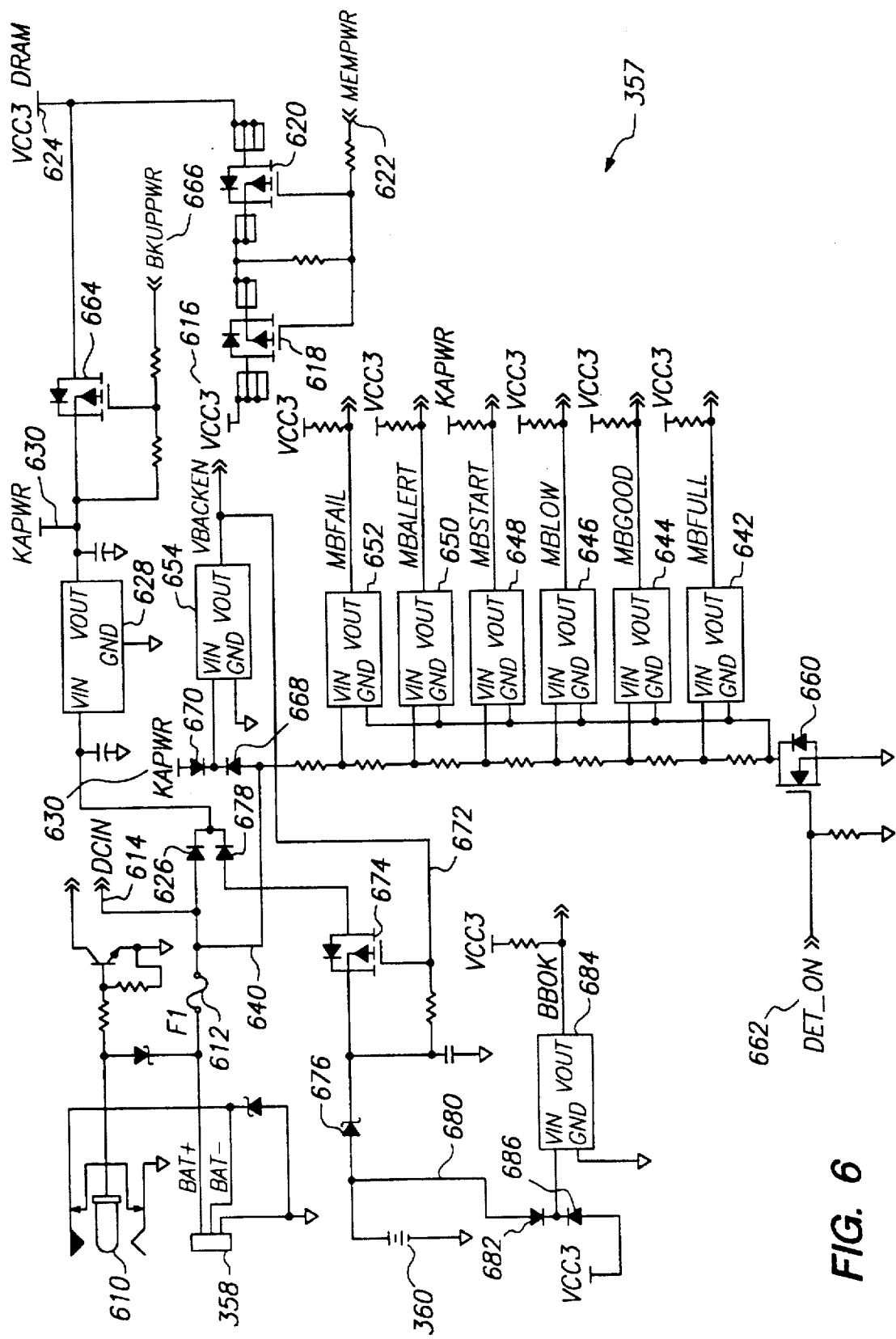
FIG. 6 is a schematic diagram of the preferred embodiment for the battery interface of FIG. 3.

Referring now to FIG. 6, a schematic diagram of the preferred embodiment for battery interface 357 is shown. In the normal operation mode of camera 110, main batteries 358 provide a main battery voltage through fuse 612 to power supply 356 (FIG. 3) via line 614. External direct current (DC) power can also be connected to camera 110 via connector 610. Backup batteries 360 are disconnected in the normal operation mode by maintaining Field Effect Transistor (FET) switch 674 in a turned-off state.

Power supply 356 responsively generates several supply voltages including voltage VCC3 (616). In normal operation mode, power manager 342 turns on complementary FET switches 618 and 620 via MEMPWR signal 622. Voltage VCC3 (616) is thus connected to VCC3 DRAM (624) which is routed to provide operating power to DRAM 346 and CPU 344.

The main battery voltage is also connected through diode 626 to voltage regulator 628 which provides a regulated Keep-Alive Power voltage (KAPWR) 630 to operate power manager 342 and the real-time clock in CPU 344. In normal operation mode, power manager 342 turns off FET switch 664 using BKUPWR signal 666.

The main battery voltage is provided via line 640 to voltage sensors 642 through 654 which are activated when FET switch 660 is turned on via DET_ON signal 662. In normal operation mode, sensors 642 through 654 sense the main battery voltage level and notify power manager 342 when the main battery voltage reaches a series of decreasing threshold levels.

In the preferred embodiment, sensor 642 sends a MBFULL signal to power manager 342 when 7.4 volts are sensed. Sensor 644 sends a MBGOOD signal to power manager 342 when 6.8 volts are sensed, and sensor 646 sends a MBLOW signal to power manager 342 when 6.4 volts are sensed. Sensor 648 sends a MBSTART signal to power manager 342 when 6.0 volts are sensed, and sensor 650 sends a MBALERT signal to power manager 342 when 5.4 volts are sensed.

When sensor 652 senses a main battery voltage of 5.2 volts, a MBFAIL signal is sent to power manager 342. In response, power manager 342 generates a powerfail interrupt, thus causing CPU 344 to perform a powerdown sequence which powers down the non-critical camera 110 subsystems by removing power from main power bus 362.

During a powerfail interrupt condition, power manager 342 determines whether captured image data is present within DRAM 346 by finding out whether a corresponding MSAVE bit has been set. If the MSAVE bit has been set, then power manager 342 turns on FET switch 664 using BKUPWR signal 666 and thereby connects the KAPWR 630 voltage to VCC3 DRAM (624) to provide power to DRAM 346 and CPU 344. In a powerfail condition, the present invention thus preferably only powers DRAM 346 and CPU 344 when captured image data is present and must be protected.

Power manager 342 simultaneously turns off FET switches 618 and 620 using MEMPWR signal 622 and thereby disconnects supply voltage VCC3 (616) from VCC3 DRAM (624). The complementary FET switches 618 and 620 are back-to-back "P" and "N" type FETs which prevent leakage from VCC3 DRAM (624) to supply voltage VCC3 (616) when the FET switches 618 and 620 are turned off.

After power manager 342 generates the powerfail interrupt, backup batteries 360 initially remain disengaged because FET switch 674 is turned off via the VBACKEN signal from voltage sensor 654. Main batteries 358 continue to provide a main battery voltage level to KAPWR 630 (to supply power manager 342 and the real-time clock in CPU 344). If captured image data is present in DRAM 346, main batteries 358 also supply VCC3 DRAM (624) (to power DRAM 346 and CPU 344) via FET switch 664. The present invention thus fully utilizes the power in main batteries 358 and thereby conserves power in backup batteries 358.

Voltage sensor 654 senses the main battery voltage level via line 640 and diode 668. When the main battery voltage level reaches 4.5 volts, sensor 654 generates a VBACKEN signal which is sent to power manager 342. The VBACKEN signal also turns on FET switch 674 via line 672 to connect backup batteries 360 to regulator 628 through diode 676. FET switch 674 and diode 678. Backup batteries 360 are thus engaged to provide a backup battery voltage when sensor 654 detects the main battery voltage level of 4.5 volts. Regulator 628 then responsively generates the regulated KAPWR voltage 630 which may also be provided via FET switch 664 to VCC3 DRAM (624) if captured image data is present in DRAM 346.

Sensor 654 also receives voltage KAPWR 630 through diode 670 to maintain a voltage level on the sensor 654 input, even when the main battery voltage level drops to zero. This KAPWR 630 voltage level maintains the input of sensor 654 within its normal operating range and permits the normal functioning of sensor 654 if main batteries 358 cease functioning or are removed from camera 110.

Sensor 684 detects the backup battery voltage level via line 680 and diode 682 and responsively sends a BBOK signal to power manager 342 until a threshold level of 5.0 volts is reached. Sensor 684 also receives VCC3 (616) through diode 686 to maintain a voltage level on the sensor 684 input, even when the backup battery voltage level drops to zero. This VCC3 (616) voltage level maintains the input of sensor 684 within its normal operating range and permits the normal functioning of sensor 684 if backup batteries 360 cease functioning or are removed from camera 110.

Figure 7:
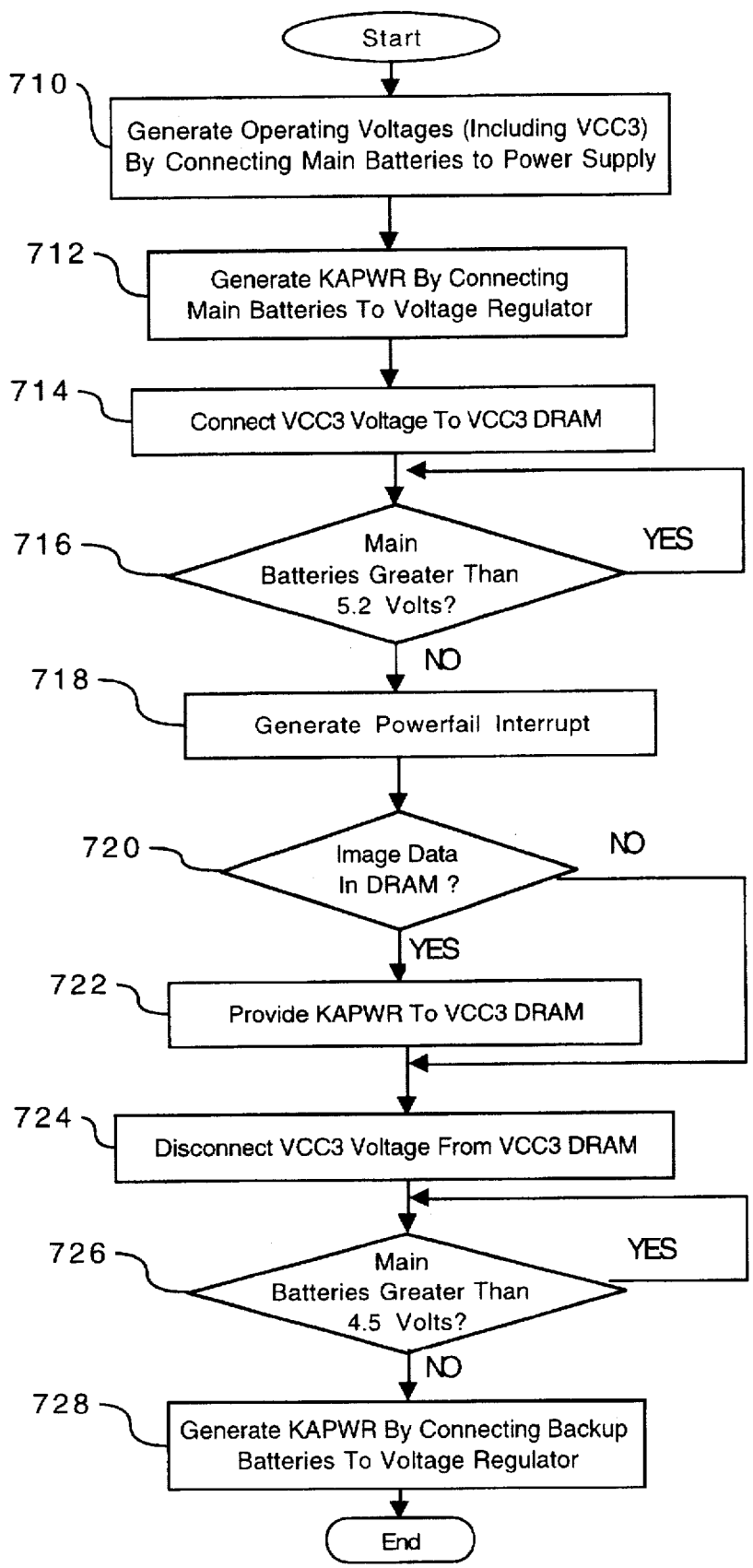
FIG. 7 is a flowchart showing preferred method steps for conserving backup battery power, according to the present invention.

Referring now to FIG. 7, a flowchart of preferred method steps for conserving power in backup batteries 360 is shown. Initially, camera 110 generates 710 operating voltages by connecting main batteries 358 to power supply 356. These operating voltages include VCC3 (616) as shown in FIG. 6. Next, camera 110 generates 712 Keep-Alive Power (KAPWR) 630 by connecting main batteries 358 to voltage regulator 628 (FIG. 6). Then, power manager connects 714 the VCC3 voltage 616 to VCC3 DRAM 624 (to supply DRAM 346 and CPU 344) by turning on FET switches 618 and 620 via MEMPWR signal 622.

Power manager 342 monitors voltage sensor 652 to determine 716 whether the voltage level of main batteries 358 is greater than 5.2 volts. When the voltage level of main batteries 358 drops below 5.2 volts, power manager 342 responsively generates a powerfail interrupt and begins the powerdown sequence designed to protect captured image data within camera 110. The powerdown sequence includes removing operating power from the non-critical subsystems of camera 110.

Power manager 342 determines 720 whether there is captured image data currently present in DRAM 346 by finding out whether the MSAVE bit has been set. If captured image data is present, power manager 342 provides 722 KAPWR 630 to VCC3 DRAM 624 by turning on FET switch 664 via BKUPWR signal 666. Power manager 342 then disconnects 724 VCC3 voltage 616 from VCC3 DRAM 624 by turning off FET switches 618 and 620 via MEMPWR signal 622.

Voltage sensor 654 determines 726 whether the voltage level of main batteries 358 is greater than 4.5 volts. When the voltage level of main batteries 358 drops below 4.5 volts, sensor 654 detects the 4.5 volts through line 640 and diode 668 and responsively turns on FET switch 674 by placing a VBACKEN signal on line 672. The present invention thereby connects backup battery 360 to voltage regulator 628 to generate voltage KAPWR 630.

The invention has been explained above with reference to a preferred embodiment. Other embodiments will be apparent to those skilled in the art in light of this disclosure. For example, the present invention may readily be implemented to sense and respond to various voltage levels other than those described in conjunction with the preferred embodiment. Further, the electrical components, such as the FET switches and voltage sensors may be implemented using other devices which perform a similar function. Therefore, these and other variations upon the preferred embodiment are intended to be covered by the present invention, which is limited only by the appended claims.

What is claimed is:

1. A system for conserving power within a backup battery, comprising:
    a main battery for generating a main operating voltage and a secondary operating voltage;
    a switching device for connecting said main operating voltage to a secondary power bus which powers a memory device; and
    a power manager for sensing when said main battery drops to a first threshold voltage, whereupon said power manager connects said secondary operating voltage to said secondary power bus only if said memory device contains data, and disconnects said main operating voltage from said secondary power bus;
    said backup battery generating said secondary operating voltage when said power manager senses that said main battery has reached a second threshold voltage.

2. The system of claim 1 wherein said secondary operating voltage provides operating power to said power manager.

3. The system of claim 1 wherein said power manager engages said backup battery via a second switching device to provide said secondary operating voltage to said memory device.

4. The system of claim 1 further comprising a first sensing device which said power manager uses to sense said first threshold voltage and a second sensing device which said power manager uses to sense said second threshold voltage.

5. The system of claim 4 wherein said first threshold voltage is at a higher voltage level than said second threshold voltage.

6. A method for conserving power within a backup battery, comprising the steps of:
    generating a main operating voltage and a secondary operating voltage using a main battery;
    connecting said main operating voltage to a secondary power bus which powers a memory device;
    sensing when said main battery drops to a first threshold voltage, whereupon a power manager connects said secondary operating voltage to said secondary power bus only if said memory device contains data, and disconnects said main operating voltage from said secondary power bus; and
    generating said secondary operating voltage with said backup battery when said power manager senses that said main battery has reached a second threshold voltage.

7. The method of claim 6 wherein said secondary operating voltage provides operating power to said power manager.

8. The method of claim 6 wherein said power manager engages said backup battery via a switching device to provide said secondary operating voltage to said memory device.

9. The method of claim 6 further comprising a first sensing device which said power manager uses to sense said first threshold voltage and a second sensing device which said power manager uses to sense said second threshold voltage.

10. The method of claim 9 wherein said first threshold voltage is at a higher voltage level than said second threshold voltage.

11. A computer-readable medium comprising program instructions for conserving power in a backup battery by performing the steps of:
    generating a main operating voltage and a secondary operating voltage using a main battery;
    connecting said main operating voltage to a secondary power bus which powers a memory device;
    sensing when said main battery drops to a first threshold voltage, whereupon a power manager connects said secondary operating voltage to said secondary power bus if said memory device contains data, and disconnects said main operating voltage from said secondary power bus; and
    generating said secondary operating voltage with said backup battery when said power manager senses that said main battery has reached a second threshold voltage.

12. The computer-readable medium of claim 11 wherein said secondary operating voltage provides operating power to said power manager.

13. The computer-readable medium of claim 11 wherein said power manager engages said backup battery via a switching device to provide said secondary operating voltage to said memory device.

14. The computer-readable medium of claim 11 further comprising a first sensing device which said power manager uses to sense said first threshold voltage and a second sensing device which said power manager uses to sense said second threshold voltage.

15. The computer-readable medium of claim 14 wherein said first threshold voltage is at a higher voltage level than said second threshold voltage.

16. A system for conserving power within a backup battery, comprising:

means for generating a main operating voltage and a secondary operating voltage using a main battery;

means for connecting said main operating voltage to a secondary power bus which powers a memory device;

means for sensing when said main battery drops to a first threshold voltage, whereupon said means for sensing connects said secondary operating voltage to said secondary power bus only if said memory device contains data, and disconnects said main operating voltage from said secondary power bus; and means for generating said secondary operating voltage with said backup battery when said means for sensing senses that said main battery has reached a second threshold voltage.

17. The system of claim 16 wherein said secondary operating voltage provides operating power to said means for sensing.

18. The system of claim 16 wherein said means for sensing engages said backup battery via a switching device to provide said secondary operating voltage to said memory device.

19. The system of claim 16 further comprising a first sensing device which said means for sensing uses to sense said first threshold voltage and a second sensing device which said means for sensing uses to sense said second threshold voltage.

20. The system of claim 19 wherein said first threshold voltage is at a higher voltage level than said second threshold voltage.

* * * * *